Figure 1:
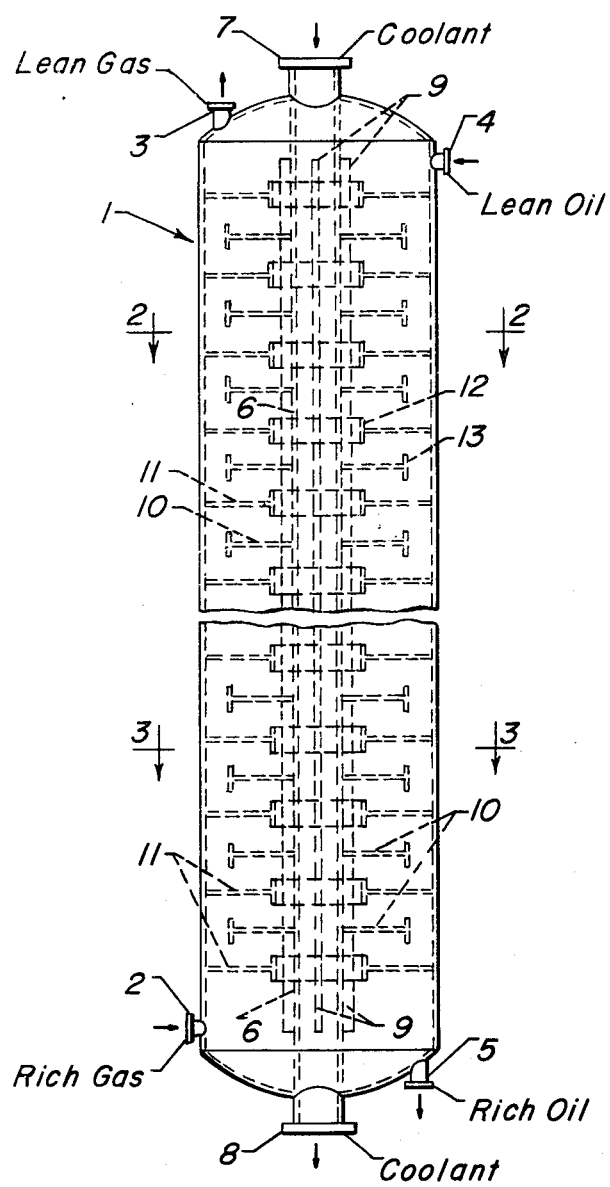

United States Patent [19]

Coste

[11] 3,894,133

[45] July 8, 1975

[54] ISO-THERMAL ABSORPTION COLUMN

[75] Inventor: Angelo C. Coste, Chicago, Ill.

[73] Assignee: Universal Oil Products Company, Des Plaines, Ill.

[22] Filed: Oct. 19, 1973

[21] Appl. No.: 408,026

[52] U.S. Cl. ................. 261/153; 261/155; 261/156
[51] Int. Cl. .............................................. B01f 3/04
[58] Field of Search........ 261/153, 155, 156, 114 R, 261/142; 202/160

[56] References Cited
UNITED STATES PATENTS

| | | | |
|---|---|---|---|
| 2,356,530 | 8/1944 | Pflock................................ | 261/153 |
| 2,804,379 | 8/1957 | Wistrich et al. ................. | 261/153 X |
| 2,918,265 | 12/1959 | Williams et al.................. | 261/153 X |
| 3,080,153 | 3/1963 | Craig et al. .................. | 261/114 R X |
| 3,094,401 | 6/1963 | Lidell............................... | 261/155 X |
| 3,179,389 | 4/1965 | Nutter............................. | 261/114 R |
| 3,293,149 | 12/1966 | Lengemann et al. ............ | 261/142 X |

Primary Examiner—Tim R. Miles
Assistant Examiner—Richard L. Chiesa
Attorney, Agent, or Firm—James R. Hoatson, Jr.; Philip T. Liggett; William H. Page, II

[57] ABSTRACT

In order to provide improved gas-liquid contacting, such as iso-thermal absorption conditions, there is provided a continuous vertically elongated heat exchange conduit positioned to extend centrally through substantially the entire height of the contacting vessel. Thus, a suitable cooling stream flowing through the conduit can, for example, provide for removing the heat being released as certain components from a gaseous stream condense into a countercurrently flowing liquid absorption phase. A preferred vessel design positions the heat exchange conduit axially through the chamber and also has fins on the conduit wall to enhance its heat exchange efficiency in contacting the liquid phase.

2 Claims, 4 Drawing Figures

ISO-THERMAL ABSORPTION COLUMN

The present invention relates to an improved form of gas-liquid contacting tower which can provide for iso-thermal operations. More particularly, there is provided an improved form of chamber which has at least one elongated heat exchange tube extending through the central portion thereof such that more efficient iso-thermal contacting conditions may be provided for the countercurrently flowing streams.

In connection with countercurrent processing operations, such as in absorption or stripping processes, there is a mass transfer in one direction such that the phase rates change rapidly through the column. In absorption, the rich gas rising through a column loses material to the descending absorbing liquid although but little of the relatively nonvolatile liquid passes into the gas phase. As a result, the gas phase decreases in quantity and the liquid phase increases in amount as it descends. With stripping operations, the direction of transfer is the reverse. In addition to the effect on phase rates, the unidirectional transfer of material creates a thermal effect on the countercurrently flowing gas and liquid phases. In absorption, there is heat of condensation and the heat released appears as sensible heat in the liquid. In stripping, the condition is again the reverse, with the sensible heat being taken up by the gas phase. In any event, under non-iso-thermal conditions, the temperature increase tends to prevent the maximum gas absorption that would be possible with an iso-thermal process.

It is realized that absorber towers have been designed and used to have one or more intercoolers connect with an intermediate portion of the tower, or connect with spaced points along a part of the height of the tower. However, such apparatus arrangements are expensive and inefficient.

It is thus a principal object of the present invention to provide at least one elongated heat exchange tube that will carry all the way through most of the height of a gas-liquid contacting chamber so as to provide for an iso-thermal operation.

It is also an object of the present invention to provide a centrally positioned conduit with external fin means down through a gas-liquid tower, such that a cooling medium may be passed through the conduit to effect an efficient substantially iso-thermal processing operation.

In one embodiment, the present invention provides an improved gas-liquid contacting vessel having full vertical flow heat exchange therethrough to permit substantially iso-thermal countercurrent contacting operations, which comprises in combination, a vertically elongated confined chamber with lower fluid port means and upper port means permitting the upward vertical passage of a gaseous stream and the downward flow of a liquid stream, a substantially vertical, interiorly positioned conduit member extending through the length of said chamber, with heat exchange fluid inlet means to one end of said conduit and fluid outlet means from the other end thereof, whereby a heat exchange fluid may be passed therethrough, and spaced baffle means throughout at least a portion of the height of said chamber around said conduit member to provide intermixing of countercurrently flowing streams while in the continuous heat exchange relationship with the latter.

Preferably, the heat exchange conduit will extend axially through a vertically oriented contacting power and will have a plurality of fins that will enhance heat exchange relationships between the fluid stream acting as a cooling media and the fluid stream within the tower. The fins may be continuous and longitudinal at spaced distances around the periphery of the conduit or there may be a multiplicity of small, short segmental fins that extend radially outwardly from the exterior surface of the conduit so as to contact the liquid media passing therearound. Also, the fins may be in a spiral configuration such that there is some spiral flow imparted to the liquid stream passing in contact therewith.

A preferred column construction also utilizes spaced baffle plates which will provide an intermixing of the countercurrently flowing gas and liquid mediums within the tower. For example, spaced disc and doughnut trays or an arrangement of side-to-side pans can be provided such that there is a recrossing type of gas and liquid flow through the entire height of the contacting chamber and good intermixing of the countercurrently flowing streams as well as a channeling of each of the fluid phases into contact with the centrally positioned heat exchange conduit such that there may be the cooling of the absorbing fluid or of the stripping gas.

Actually, a plurality of separate centrally positioned heat exchange conduits could be provided to extend longitudinally through a contacting tower; however, in most installations, it is believed that a single relatively large heat exchange conduit will serve to provide sufficient cooling to effect a substantially iso-thermal contact and at the same time provide the least expensive apparatus arrangement.

Reference to the accompanying drawing and the following description thereof will serve to indicate how one embodiment of the present improved contacting gas-liquid contacting vessel may be constructed and arranged, as well as point out certain modifications and/or advantages which may be derived from the present design for effecting iso-thermal operations.

FIG. 1 of the drawing is a diagrammatic elevational view indicating a centrally positioned heat exchange conduit for use in a gas-liquid operation.

Figure 2:
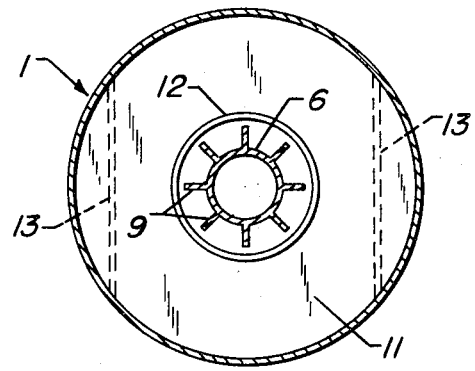
Figure 3:
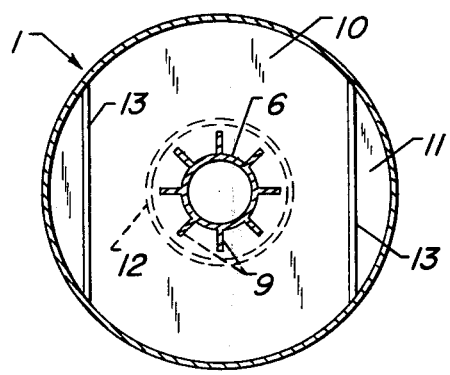

FIGS. 2 and 3 of the drawing indicate sectional plan views through the contacting vessel in accordance with the respective section lines 2—2 and 3—3 shown in FIG. 1.

Figure 4:
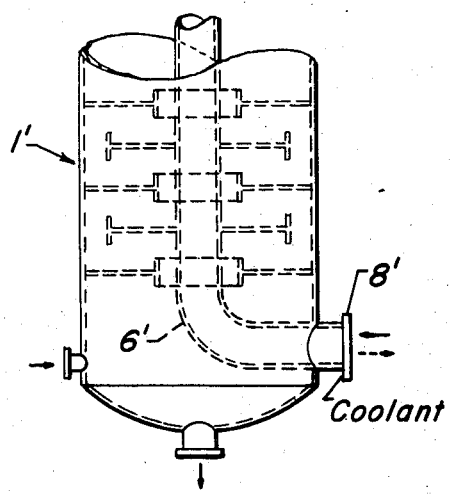

FIG. 4 of the drawing indicates diagrammatically in an elevational view the lower portion of a contacting vessel where the central heat exchange conduit passes through a lower side wall portion of the vessel rather than through the lower cap portion.

Referring now particularly to FIGS. 1, 2 and 3 of the drawing, there is indicated a vertically oriented gas-liquid contacting tower 1, such as for example an absorption vessel, where a rich gas stream may enter by way of nozzle means 2 and lean gas can be discharged by way of an upper nozzle 3, while a lean absorption oil is permitted to enter by way of an upper nozzle 4 and a rich absorption oil may discharge by way of a lower nozzle means 5. There is also indicated, in accordance with the present invention, the utilization of a relatively large diameter centrally positioned conduit member 6 with an upper inlet or outlet means 7 and a lower outlet or inlet means 8 whereby a suitable heat exchange medium may be passed through tower 1 for the full length thereof. As best shown in FIGS. 2 and 3, the conduit member 6 will have a plurality of spaced longitudinal fin members 9 which will enhance the heat exchange relationship with the gas and liquid phases flowing through column 1. While the drawing indicates that the fins 9 extend radially from the external surface of the conduit 6 and will be substantially continuous for the full length thereof, it is to be noted that the present invention is not limited to any particular number of fin means or to any one type of fin.

A preferred form of contacting chamber will also have a plurality of vertically spaced baffle plate means, such as indicated in the drawing, where there are shown a multiplicity of spaced disc-like members 10 that are in turn interspaced with a multiplicity of doughnut-like baffle members 11. Thus, there is a resulting recrossing type of flow for the gaseous stream which is rising through the column, as well as a continuously recrossing type of descending flow for the liquid phase. The present baffling also provides that both the liquid and gaseous phases will be caused to flow in close contact with the centrally positioned heat exchange conduit 6 at each of the doughnut type baffle members 11 to effect an efficient cooling of the phase being heated to, in turn, provide a desired iso-thermal type of operation. As heretofore indicated, where an absorption operation is being carried out, then the liquid absorption oil, or other absorption liquid, increases in temperature by virtue of condensing the condensible components of the gaseous stream so that by having cooling for the fully continuous elongated conduit 6 there is the continuous loss of heat from the absorption medium to the cooling medium and a resulting substantially iso-thermal operation to improve efficiency of the absorption step. Conversely, in a stripping operation the heat exchange can serve to continuously cool the gaseous phase and enhance the stripping process by virtue of a substantially iso-thermal stripping operation.

As best shown in FIG. 2 of the drawing, the doughnut-like plates 11 will have an inner ring-like wall member 12 to serve as a weir means at a spaced distance from conduit 6. The circular weir members 12 will also be spaced at sufficient distances from the conduit 6 to provide for the desired flow rates for the gas and liquid streams as well as provide room for the longitudinal fin members 9.

As best shown in FIG. 3, it will be noted that each of the alternate baffle members, or disc members 10, will also have small vertical walls or weir members 13 such that liquid and gas flows will be around the upper and lower edge portion of such weir member. In this arrangement, it is preferable that each of the plate members 10 block the central flow path and come into contact with the centrally positioned conduit member 6 and are thus necessarily notched around fin members 9 or, alternatively, the latter are discontinuous at each vertically spaced plate number 10. Further, as heretofore noted, it is not intended to limit the present invention to any one type of baffle member or baffling system; although it is desired that the spaced baffle members provide a recrossing flow for both the liquid and gas phases within the contacting tower and will provide for a good heat exchange contact during a recrossing flow with the central heat exchange conduit 6.

With reference to FIG. 4 of the drawing, there is merely indicated an alternative construction, such as where the lower portion of a contact tower 1' will have the lower end portion of the internal heat exchange conduit means 6' turn outwardly to provide nozzle means 8' that will be from a side portion of chamber 1' rather than extend from a lower end cap member. There is also indicated by the dashed arrow means at 8' that there may be an upward flow of cooling material through conduit means 6' rather than a downward flow as indicated in FIG. 1, with the direction of flow being optional depending upon the preferred conditions for effecting an iso-thermal operation.

Generally, the present improved apparatus arrangement will be of particular advantage for effecting a substantially iso-thermal absorption process where a lean absorption medium is utilized to absorb certain fractions from a rich gaseous fraction; however, the same form of apparatus arrangement may well be utilized for other gas-liquid or liquid-liquid contacting operations. For example, the same form of apparatus may well be utilized in connection with a stripping process where a lean gas is utilized to strip certain fractions from a rich liquid stream.

As one illustrative example, the present apparatus may be used in connection with an absorption tower for the gas concentration portion of a refinery operation and in particular for the absorption of propane-propylene and butane-butylene fractions into a gasoline stream so as to preclude the loss of such fractions in the gaseous discharge stream. Thus, typically, the rich absorption oil stream will tend to rise in temperature from the heat generated by heat of condensation of the propane-propylene and butane-butylene fractions into the absorbed oil stream. However, through the utilization of the continuous flow of cooling water in the range of 60° to 100° F., and preferably substantially less than the 100° F. temperature, there can be the continuous removal of heat of absorption from the system so as to minimize the temperature of the liquid medium while at the same time enhance the absorption efficiency of the liquid phase carrying out the propylene-propane absorption step. It is not intended, however, to limit the operation to water inasmuch as the heat exchange fluid may comprise other cooling media, including various refrigerant streams.

Still other variations in construction and arrangement will be apparent to those familiar with stripping and absorbing type apparatus, as for example as heretofore noted, there may be more than one full length heat exchange conduit member through the central portion of the contacting tower to provide for the heat exchange relationship with the gas and liquid phases in the tower. In any event, it is a feature of the present invention to have at least one continuous full length conduit member for the countercurrent contact tower so as to preclude the need for spaced intercoolers or the need for a plurality of in and out type of conduit arrangements which can effect only partial or spaced apart heat exchange relationships with the countercurrently flowing streams.

I claim as my invention:

1. A gas-liquid contacting vessel having full vertical flow heat exchange therethrough to permit substantially iso-thermal countercurrent contacting operations, which comprises in combination, a vertically elongated confined chamber with lower fluid port means and upper port means permitting the upward vertical passage of a gaseous stream and the downward flow of a liquid stream, a substantially vertical and interiorly positioned conduit member extending through the length of said chamber, with heat exchange fluid inlet means to one end of said conduit and fluid outlet means from the other end thereof, said interiorly positioned conduit member being provided with external longitudinally disposed fin means in order to enhance heat exchange contact with the gas and liquid phases passing therearound, whereby a heat exchange fluid may be passed therethrough, spaced baffle means throughout at least a portion of the height of said chamber around said conduit member to provide intermixing of countercurrently flowing streams while in the continuous heat exchange relationship with the latter, said spaced baffle means in said chamber comprising an alternating disc and doughnut arrangement, said disc arrangement comprising a series of discs radially extending from said fin means around said conduit member and said doughnut arrangement comprising an alternate series of doughnut-like baffle members around said fin means, said discs having weir members at the ends thereof, said baffle members having inner ring-like wall elements comprising weir means at a spaced distance from said conduit member, whereby the gas and liquid streams will necessarily be channeled back and forth across the interior portion of said vessel and effect a multiplicity of flow stream contacts with the exterior of said interiorly positioned conduit member.

2. The gas-liquid contacting vessel of claim 1 further characterized in that said interiorly positioned conduit member is placed axially throughout the full height of said contacting vessel.

* * * * *